Nov. 28, 1933.  H. G. TATOSIAN  1,936,649
BAKING IRON AND STRIPPER
Filed Jan. 28, 1932   2 Sheets-Sheet 2
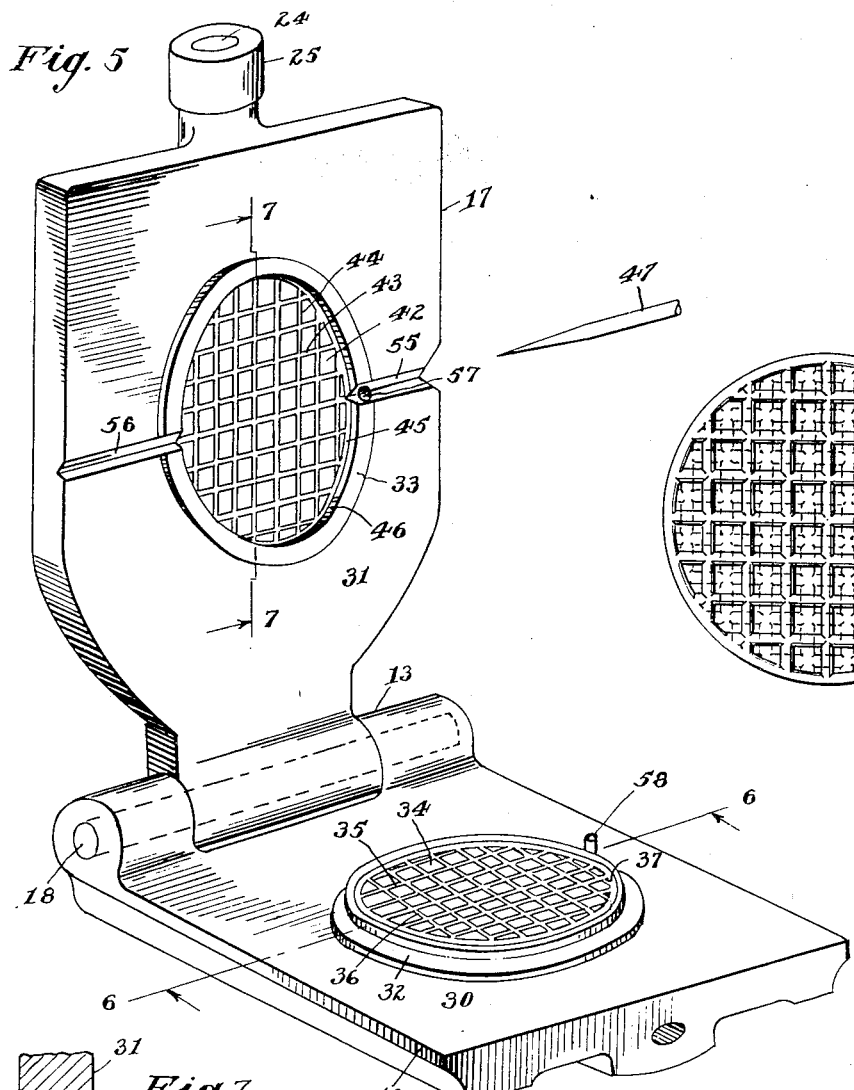
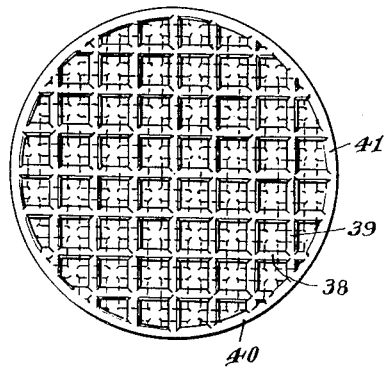
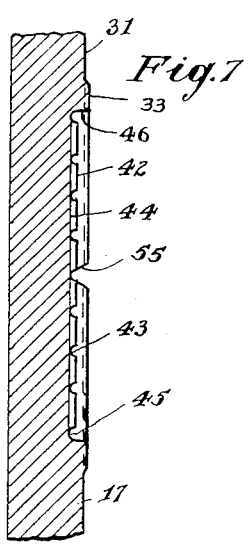
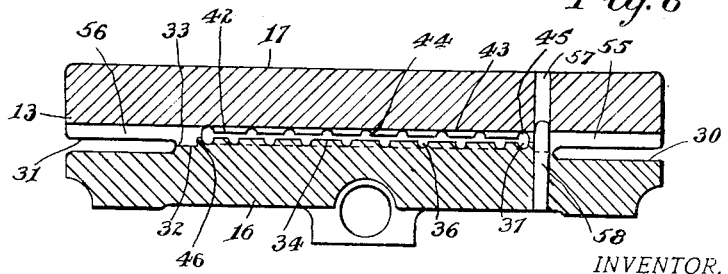
INVENTOR.
Harry G. Tatosian
BY
Christian M. Newman
ATTORNEY Patented Nov. 28, 1933

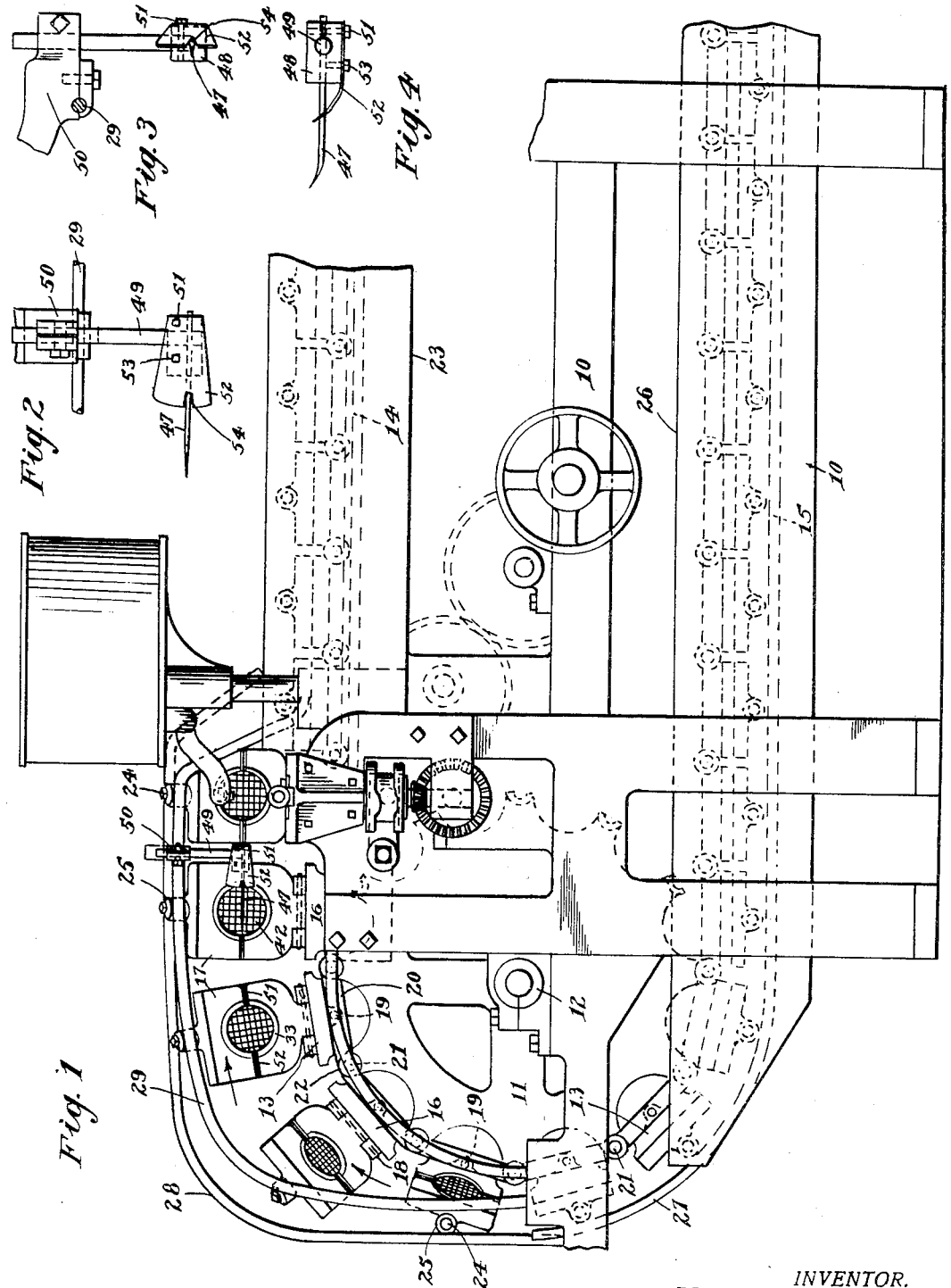

1,936,649

UNITED STATES PATENT OFFICE 1,936,649

BAKING IRON AND STRIPPER

Harry G. Tatosian, Bridgeport, Conn., assignor to Ice Cream Cone Machinery Incorporated, Bridgeport, Conn., a corporation of Connecticut Application January 28, 1932. Serial No. 589,417

9 Claims. (Cl. 107—58)

This invention refers to a baking device for producing improved pastry products, as for instance, wafers, commonly used in the forming of ice cream sandwiches and wherein a slice of ice cream is placed between two of such wafers.

The invention more specifically resides in the production of a novel form of baking iron, adapted for use in commercial cone cake baking machines now on the market, whereby finished commercial wafers may be produced with the same uniformity and rapidity with which rough edged cone cakes can be produced.

The preferred embodiment of the invention as disclosed herein is particularly applicable for use in a machine of the type shown in my prior Patent #1,540,041 and wherein it would only be necessary to replace the baking irons shown therein with the baking irons of my present invention.

The type of baking iron herein shown differs from the so called cake baking iron usually employed in cone cake baking machines, in that the baking areas of my present iron are of specific design and dimensions. The baking area of one of the pair of irons being raised, and the area of the other recessed in a manner to receive the raised portion, and form a confined space therebetween in which the batter is distributed, shaped and baked to form a wafer.

As is usually customary in baking irons of this general type the present iron is formed in two parts hingedly connected together and adapted to be placed in and removed from a baking machine, as a unit. When so applied to a machine the iron travels in an endless path together with others of like construction. During this travel the top plate of the iron is raised from the lower one to receive the batter and then lowered upon the batter in manner to spread and evenly distribute the same between the two plates. The closed irons are thereupon conveyed through a heating chamber and back to the unloading station where the top iron is again automatically raised and the wafer removed, after which batter is again applied to the lower plate and the operation repeated.

The batter feeding devices employed on cake baking machines are constructed so as to deposit substantially equal amounts of batter upon each of the lower members of the baking iron. While these feeding devices are sufficiently accurate to deposit approximately like amounts of batter upon the successive irons, for cone cake purposes, wherein the edges do not have to be of exact uniform size, yet in the matter of wafer baking it is important that all wafers of a given design be of the same size, therefore, in the design of my wafer iron I have not only provided a restricted baking area but also provided an outlet therefrom whereby any surplus dough which may be deposited upon the lower plate and inclosed within the baking area of the closed irons, may run out at a fixed point from the edge of the baking area. This produces a small fin upon the edge of the wafer when baked, which can readily be broken off. The method employed in my present instance, in order to insure the production of a full sized wafer, being to deposit an amount of batter upon the lower plate slightly in excess of that which is actually necessary to form a cake.

In this respect it will be noted that the batter is deposited on the baking area of the lower plate or male member since this baking surface area is formed slightly above that of the remaining surface of the lower plate, whereas the baking surface and area of the upper plate forms a recess with respect to the surrounding flat surface of the upper baking member. The baking areas of the two plates are obviously of substantially the same dimension, one being adapted to fit into the other so that the opposing baking surfaces will lie in spaced relation to form a chamber that determines the size of the wafer.

In this connection it is to be understood that while the batter is deposited upon the lower plate yet when the baking operation is completed, and the two members separated by the raising of the top plate to the position shown in Fig. 4, the wafer which has just been baked adheres to the top plate and remains within the recess comprising the baking area of that member and must therefore be manually removed. This has heretofore been done by hand and was not only difficult and laborious but frequently defaced the wafer.

It is therefore the object of my invention to not only provide an automatic mechanical means for removing these wafers from the recessed female member of the baking iron but to provide a baking area as between two members of a baking iron which will quickly and uniformly distribute the batter within limited area so that a wafer having a reinforced edge portion intersecting transverse ribs, can be baked, thereby forming a reinforced and strong wafer.

With the above and other objects in view the invention resides and consists in the construction, arrangement and combination of parts as will now be more fully described and hereafter specifically claimed, it being understood that such changes in arrangements and parts and details of construction may be made, as fall within the spirit of the invention and within the scope of the accompanying claims.

Similar characters of reference will be found to indicate like or corresponding parts throughout the several figures of the drawings and preferred embodiment of the invention, and of which:

Fig. 1 shows a side elevation of one end portion only of a baking machine of the general design and type of that illlustrated and dedscribed in my United States Letters Patent herein and before mentioned;

Fig. 2 is an enlarged detached side view of the stripper pin and its supporting means, shown applied to the machine in Fig. 1;

Fig. 3 is a front elevational view of the same stripper means, shown in Figs. 1 and 2;

Fig. 4 shows a top plan view of the picker and shield, and supporting post, shown in Fig. 2;

Fig. 5 shows a perspective view of a baking iron in an open position constructed in accordance with my invention;

Fig. 6 shows a cross section, on a slightly enlarged scale of the iron shown in Fig. 5, in a closed position and taken on line 6 of said figure;

Fig. 7 shows a vertical sectional view of the upper and raised plate of the baking iron, shown in Fig. 5 and taken on line 7—7 of said figure, and Fig. 8 shows a plan view also on an enlarged scale, of a pastry wafer as produced by my baking iron illustrated in the preceding figures.

Referring in detail to the characters of reference marked upon the drawings, 10 represents the frame members of a wafer baking machine and 11 a large double form of sprocket wheel, mounted in bearings 12 in one end portion of the frame and which may be operated in any suitable manner, not shown. A chain of baking units or irons 13 are employed in this machine, one portion of the chain being mounted on the sprocket and another portion being supported on a similar sprocket in the other end of the machine, not shown. Tracks 14 and 15 serve to support and guide the chain during its travel through the machine. A double line of these chains of like construction, one in each side of the machine may be employed together with the associated novel mechanisms for removing the wafers, later to be described. These chains comprise a series of baking units linked together and supported on the sprockets and tracks before referred to.

Each baking unit or iron comprises a lower baking plate 16 and an upper baking plate 17, the two being hingedly connected by a pivotal pin 18 so that the upper plate is free to be raised and lowered to and from the lower plate. The lower baking plate is supported upon a cross rod 19 whose end portions engage holes in links 20. These links are also provided with holes in their end portions in which the ends of cross rods 21 are mounted and upon which end portions rollers 22 are also carried.

These rollers 22 serve to ride on the inner tracks 14, before mentioned, to insure the free travel and proper guidance of the chain of baking irons into and through the upper baking oven 23 of the machine, during the baking of the wafer. The upper baking plate is provided upon its outer end portion with a stud 24 which carries a roller 25 that engages and rides upon the lower track 15 as the chain of baking units travel forward through the lower baking oven 26. The forward end of this track 15 is curved upward as at 27 and serves to support the closed baking units in an inverted position, from that occupied during their rearward travel through the upper part of the machine, and retains the outer plate in a closed position until it moves up about half the distance from its lower line of travel to its upper line of travel. At this point in the machine I provide a pair of guide rods 28 and 29, the end portions of which are suitably attached to the machine. These guide rods are of proper shape and suitably spaced apart to form guides or cams upon and between which the rollers 25 of the upper baking plates roll in a way to lift the free end portions of said upper plates from the lower plates, leaving the baked wafer exposed within said upper plate.

The inner flat surface 30 of the lower plate 16 and the like surface 31 of the upper plate 17, when closed, are parallel to each other, see Fig. 6. The plate 16 is provided with a raised annular engaging surface 32 and the plate 17 with an annular flat surface 33 which surfaces when engaged determine the relative position of one plate with respect to the other. The baking area 34 of the lower plate is slightly above the surface of the annular surface 32 and is provided with a series of intersecting grooves 35 and 36 and a border groove 37 which in this instance is annular and with which the intersecting grooves obviously serve to form the ribs 38 and 39 on one side of the wafer 40 while the border groove 37 serves to form the border rib 41 on the same side of the wafer.

The upper plate of the baking iron, as before suggested has a central recessed portion, the bottom surface 42 of which lies below, see Figs. 5, 6 and 7, of the surface 31 of the baking plate 17 and is provided with intersecting grooves 43 and 44 which like the intersecting grooves of the lower plate connect with an annular groove 45 that is positioned adjacent to the inner annular wall 46 of the recess. The diameter of this recess as fixed by the wall just mentioned is slightly larger than the diameter of the raised baking area of the lower plate so as to receive the same when the two plates are closed together.

The intersecting grooves in the baking surface of the upper plate are arranged alternately with respect to the intersecting grooves of the lower plate so that the ribs formed upon the top side of the wafer will be out of alignment with the ribs on the under or opposite side, which together with the border ribs serve to strengthen the wafer and prevent it from being easily broken.

My improved means for dislodging and removing the wafer from the top plate of the iron comprises a stripper pin 47 that is positioned in a bore of a block 48 carried on a depending post 49 that is adjustably mounted in a yoke 50 fixedly attached to guide rods 28 and 29 heretofore mentioned.

One end of the block is split vertically in as far as the hole for the post and in alignment with the hole for the stripper pin. By this means both the post and the stripper may be secured in their respective positions by means of a clamping screw 51 mounted in the split end of the block. The forward end of the stripper is preferably deflected inward slightly, better to engage the grooves in the plate.

In order to insure a more uniform engagement of the wafer and its positioning in a receptacle positioned below to receive it, I secure a shield 52 to the before mentioned block 48 by means of the before mentioned screw 51 and an additional screw 53. The forward free end portion of this shield is slotted, as at 54, to straddle the stripper pin and whereby as the pin is slipped in under the wafer its edge portion will be engaged by the inclined flat portion of the shield, causing the wafer to relieve itself from the stripper and assume an upright position against the shield preparatory to being dropped.

The stripper pin 47 is disposed horizontally and with special reference to the travel of the upper plate of the baking iron so that the stripper will be caused to travel across and engage the underside of the plate including the surface of the baking area of said plate. In this connection it will be seen that I have provided aligned transverse grooves 55 and 56 in the face of the surface of the upper plate, each extending from a side edge of the plate to the recess, and is of sufficient depth so that the bottoms thereof align with the bottom of one of the transverse grooves in the surface of the baking area and whereby the point of the stripper will travel unobstructedly first through the foremost groove 55 and then through the transverse groove in the baking area and finally into and through the groove 56 and whereby the underside of the wafer is engaged and forced out of the pocket on to a suitable receiving means, not shown.

In practice the groove 56 serves as an outlet for any excess batter, which may be contained within the baking area, so that the same may be discharged to form a fin that will be located at desired points on all wafers. In order to insure desired results and to prevent the dough from also running back through the groove 55, I provide means for closing the last mentioned groove during the baking operation and opening it during the wafer removing operation. This means consists, see Figs. 5 and 6, in providing a hole 57 in the groove 55 of the upper plate 17 and a pin 58 in the lower plate 16, that projects upward therefrom in position to engage and enter the groove and hole of the upper plate when the two plates are laid together.

My invention obviously applies equally to a baking iron adapted to produce forms of wafers, other than round, as for instance square or oblong, and is also not to be limited to an iron having either transverse or border grooves. I also do not wish to be limited to baking irons wherein the baking surfaces of the plates are either raised or countersunk and the other raised so that their edge portions will more tightly close together.

Having thus described my invention, what I claim and desire to secure by Letters Patent is:

1. A wafer baking unit, comprising two plates movable with respect to each other, one having a countersunk baking surface and the two adapted to be closed in spaced relation to form a baking chamber, aligned grooves formed in the face of one of said plates outside of and connected with the baking chamber formed between the said baking surfaces, and means for closing one of said aligned outside grooves during the baking operation.

2. A wafer baking unit, comprising two plates movable with respect to each other, one having a countersunk baking surface and the two adapted to be closed in spaced relation to form a baking chamber, aligned grooves formed in the face of one of said plates outside of and connected with the baking chamber formed between the said baking surfaces, means for closing one of said aligned outside grooves during the baking operation, and means for opening said closed groove after the baking operation has been completed.

3. A wafer baking unit, comprising two members having baking surfaces adapted to be closed in spaced relation to form a baking chamber therebetween, transverse grooves formed in one of said baking surfaces, aligned grooves formed in one of said members outside of and connected with the baking chambers and in alignment with one of the transverse grooves in said baking surface.

4. A wafer baking unit, comprising two members having baking surfaces adapted to be closed in spaced relation to form a baking chamber therebetween, transverse grooves formed in one of said baking surfaces, aligned grooves formed in one of said members outside of and connected with the baking chamber and in alignment with one of the transverse grooves in said baking surface, a stripper pin, and means for causing relative movement of said members and stripper pin whereby a wafer is engaged and removed from one of said members.

5. A wafer baking unit, comprising two members having baking surfaces adapted to be closed in spaced relation to form a baking chamber therebetween, transverse grooves formed in one of said baking surfaces, aligned grooves formed in one of said members outside of and connected with the baking chamber and in alignment with one of the transverse grooves in said baking surface, stripper means arranged to travel through the outside grooves and an aligned transverse groove in said baking surface to engage the side of a wafer and to remove it from said surface.

6. A wafer baking unit, comprising two movable baking members having baking surfaces adapted to be closed in spaced relation to form a baking chamber therebetween, transverse grooves formed in one of said baking surfaces, aligned grooves formed in one of said members outside of and connected with the baking chamber and in alignment with one of the transverse grooves in said baking surface, a stripper pin positioned to travel through said aligned grooves in a manner to remove a baked wafer therefrom, means carried by one member to close one of the aligned grooves in the companion member when the two members are closed.

7. A wafer baking unit, comprising two plates movable with respect to each other, one having a raised baking surface and the other a countersunk baking surface, one adapted to be closed into the other and in spaced relation to form a baking chamber, the countersunk baking surface having a transverse groove formed therein, grooves formed in the face of said last mentioned plate outside of and connected with the baking chamber formed between the said baking surfaces, a stripper pin, and means for causing relative movement of said plates and pin whereby a wafer is engaged and removed from said plate.

8. The combination with a wafer baking iron, of a stripper for stripping a wafer from the iron, said iron and stripper being movable with respect to each other, a shield carried with and upon one side of the stripper to engage the wafer as it passes from the stripper.

9. The combination with a wafer baking iron, of a stripper for stripping a wafer from the iron, said iron and stripper being movable with respect to each other, a shield carried with and upon one side of the stripper and arranged at an angle with respect to the stripper to receive and direct a wafer therefrom to engage the wafer as it passes from the stripper.

HARRY G. TATOSIAN.